April 8, 1958     O. J. KEIPER     2,829,846
VERTICAL FLYING MACHINE
Filed Sept. 26, 1955     2 Sheets-Sheet 1
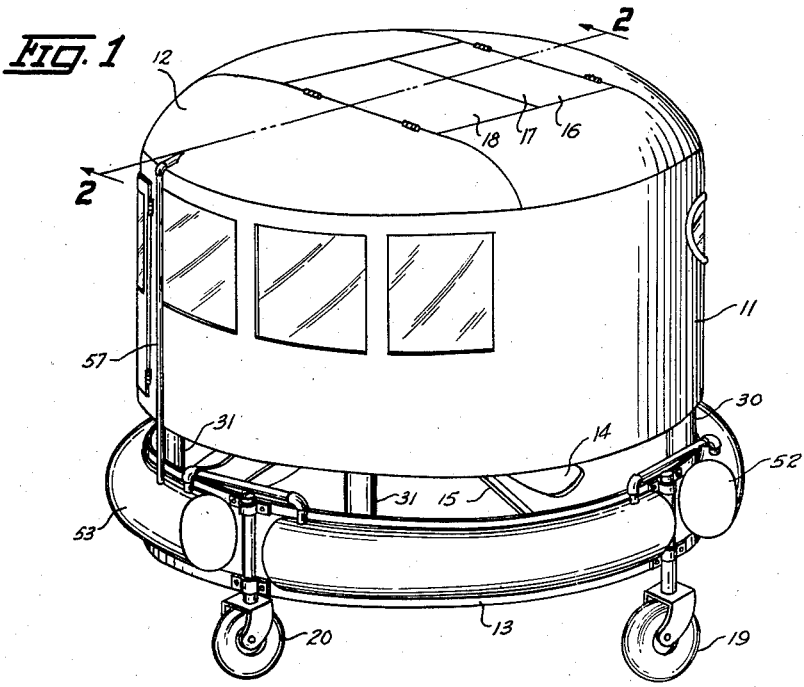
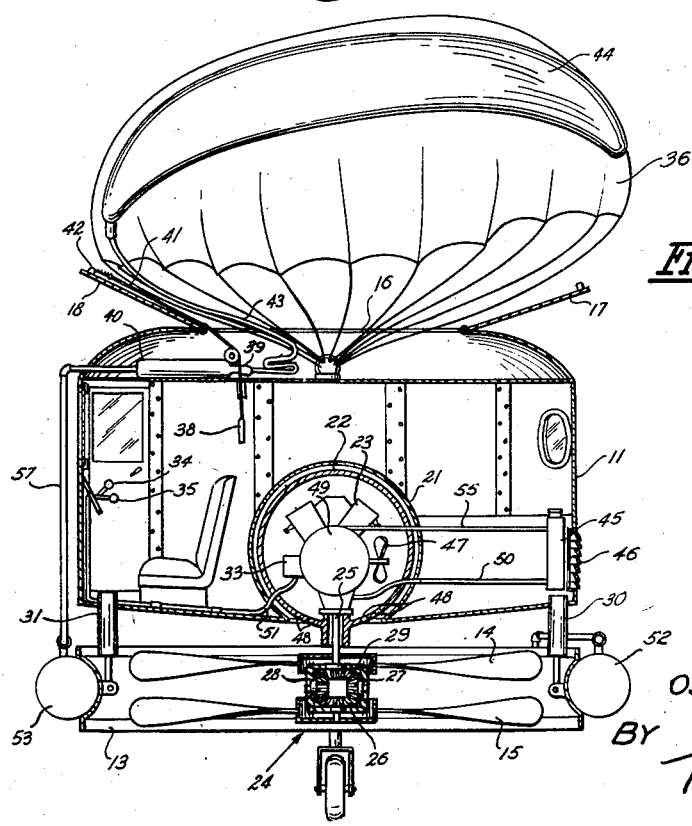
INVENTOR.
OSWALD J. KEIPER
BY *Flournoy Corey*
ATTORNEY.

April 8, 1958

O. J. KEIPER 2,829,846

VERTICAL FLYING MACHINE

Filed Sept. 26, 1955

INVENTOR.
OSWALD J. KEIPER
BY
*Flournoy Corey*
ATTORNEY.

United States Patent Office 2,829,846
Patented Apr. 8, 1958

2,829,846
VERTICAL FLYING MACHINE
Oswald J. Keiper, Waterloo, Iowa
Application September 26, 1955, Serial No. 536,671
4 Claims. (Cl. 244—23)

This invention relates to a vertical flying machine and has particular reference to a machine employing shrouded counter-rotating propellers and an emergency landing device.

It is recognized that shrouded counter-rotating propellers provided with sufficient horsepower have a high thrust and can be employed to secure the vertical ascent of an aircraft. However, it is also understood that such propellers provide the only lifting forces for such an aircraft and that should the power source fail and the propellers stop, the aircraft will fall immediately, since it has no static supporting devices such as wings or airfoils.

Vertical flying machines, such as the helicopter and autogiro, are of course well known to the art. Should the power source fail in such devices, the rotors immediately become or perform the functions of wings and permit the gradual descent of the aircraft.

It is therefore an object of my invention to provide a device employing shrouded propellers in which, should the lifting forces fail, the pilot may utilize an emergency parachute to lower the aircraft to the ground.

It is yet another object of my invention to provide a device in which selective directional movement in a horizontal plane may be accomplished by tilting the propellers in relation to the fuselage.

It is yet another object of my invention to provide a device in which the inflation of a contoured bag will cause a parachute to be ejected from the aircraft.

It is still another object of my invention to provide a device in which the opening of a hatch will automatically cause a parachute to be ejected.

It is yet another object of my invention to provide a device of the type described in which both the power source or engine and a drive means for propellers may be tilted in relation to the fuselage to secure directional movement.

Other and further features and objects of the invention will be more apparent to those skilled in the art upon a consideration of the accompanying drawings and following specifications, wherein is disclosed a single exemplary embodiment of the invention, with the understanding however, that such changes may be made therein as fall within the scope of the appended claims, without departing from the spirit of the invention.

In said drawings:

Figure 1 is a three-quarter view in perspective of an aircraft constructed according to my invention.

Figure 2 is a cut-away view in cross section showing the interior of the aircraft disclosed in Figure 1.

Figure 3:
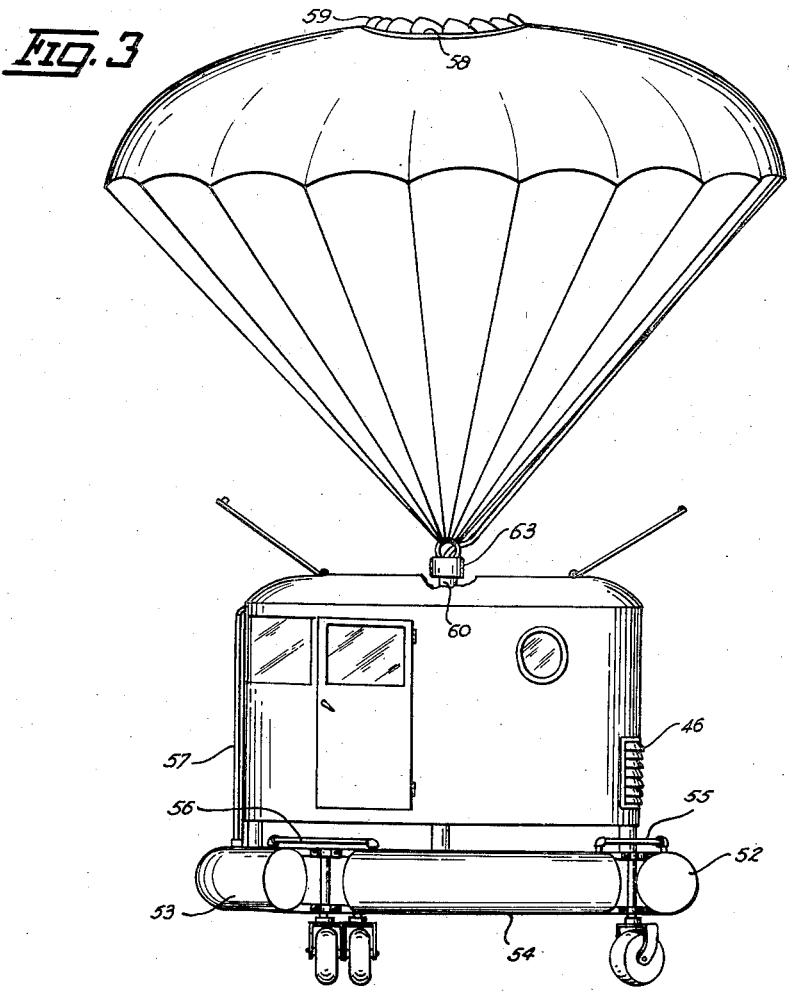
Figure 3 is a side view of the aircraft having a parachute adapted to windmill.

Referring now to Figure 1; generally, the aircraft includes a fuselage 11 having a cover portion 12. Immediately below the fuselage is a shroud 13 in which are encased two counter-rotating propellers 14 and 15. The cover portion includes a hatch, indicated generally at 16, which consists of two opposed doors 17 and 18 which are adapted to open outwardly. Beneath these opposed doors and in the fuselage a parachute device 36 is carried in a collapsed position. To permit handling on the ground, a plurality of casters, such as 19 and 20, are provided.

Referring now to Figure 2; the device is shown in greater detail. The fuselage 11 contains a pilot compartment an engine housing 21, and a cooling conduit 22. Immediately below this fuselage is the shroud 13 and two propellers 14 and 15.

It is to be noted that the engine 23 is mounted in the housing 21 and adapted to pivot in all directions. This is achieved by providing a ball-shaped housing 21 with a secondary ball-shaped housing 22 inside of the first housing. It is this second housing which carries the engine 23, and the shaft assembly 24 extending downwardly from the engine through the inner housing 22. The drive shaft 25 of the engine is fixedly attached to the propeller 15. Also mounted on this propeller is a beveled gear 26 which, through means of two intermediate beveled gears at right angles 27 and 28, is operatively connected to a fourth gear 29 which in turn is fixedly attached to the second propeller 14.

It will be apparent that the power-driven propeller 15 will drive the gears 26, 27, 28 and 29, causing the second propeller 14 to turn in an opposite direction. These two counter-rotating propellers operating within the shroud 13 will provide the required lift to cause the aircraft to rise in a vertical direction.

It will also be noted that the fuselage is spaced some distance above the shrouded propellers. To connect the fuselage to the shroud, I have provided a plurality of hydraulic jacks, such as 30 and 31. It is preferable that four such hydraulic packs be employed at 90 degree intervals about the circumference of the shroud. These hydraulic jacks are driven by conventional hydraulic pumps operating off of the engine at 33. The control valves 34 and 35 serve to regulate the flow of hydraulic fluid into these jacks. In this manner, the operator of the aircraft may tilt the shroud and propellers in relation to the fuselage. It will be apparent that as the shroud is angled, the air flow into one 180 degree sector of the shroud will be reduced progressively, the closer the shroud moves towards the fuselage. This will create a one-sided lift and the aircraft will then tend to move horizontally in a direction opposite to the lift since it will be unbalanced. The tendency of movement will also be downward. However, by increasing the speed of the propellers, sufficient lift can be achieved by the remaining effective portion of the propellers to maintain the desired altitude.

It will be apparent that the vertical and horizontal positions of the aircraft are easily controllable so long as the engine and shrouded propellers are operating. In the event that there is an engine failure, the propellers completely lose their effectiveness, and although they may tend to windmill, will apply no appreciable lift.

In order to permit the gradual descent of the aircraft, I have provided a parachute 36 which is carried in the top of the fuselage in the chamber 37. When the operator wishes to activate this parachute, he may do so by operating the lever mechanism shown at 38. This lever mechanism is operatively connected to a valve 39 which is attached to a pressurized gas chamber 40 and a cable mechanism 41. This cable mechanism is in turn attached to a latch member 42 on the door 18. When the bolt of the latch member is pulled, the two opposed doors are released and tend to open as the parachute pushes up against them.

The pressurized gas chamber 40 carries some suitable lighter-than-air gas, such as helium. Upon opening of the valve 39, the helium escapes through a tube 43 into a special chamber 44, which is in the upper portion of the parachute. As this chamber inflates, the chute is expanded outwardly and upwardly, pushing aside the hatch covers 17 and 18. Of course once the chute is fully expanded, it immediately stops the descent of the aircraft and lowers it in an orderly and safe rate towards the ground.

It will also be noted that I have provided a secondary gas storage system in the form of tanks 52, 53 and 54. These tanks are interconencted by conduits 55 and 56 and then with the primary tank 40 by conduit 57. It will be apparent that these tanks serve a double purpose in that when emptied, they will act to float the aircraft if it should be landed on the water.

In Figure 3 I have disclosed a second embodiment of my invention. In this view, the parachute is adapted to swivel about the anchor point with a circular motion. This windmilling effect slows the descent of the craft.

To secure the desired action, the parachute has a circular opening 58 at the top. This opening is provided with a plurality of circular vanes 59, all of the vanes being angled to cause the movement of the air through the opening to impart a counter-rotating force to the chute.

Figure 4:
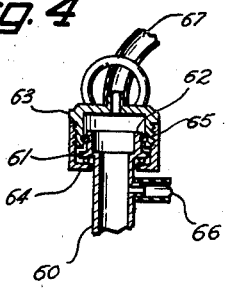
Figure 4 is an enlarged cross sectional view of the swivel joint between the aircraft and the parachute.

It should also be noted that movement of gas through the swivel connection is provided by a joint, such as shown in Figure 4. The main anchor tube 60 is flanged at the top to provide an overhanging lip 61. A second flange 62 projects upwardly from this flange. A cap 63 with an inwardly extending flange 64 is provided to engage the flange of the anchor tube ball bearings being positioned between the two flanges to secure free movement. The cap and the tube are sealed in relation to each other by an O ring 65. Gas is fed into the joint by tube 66 and passes out of the joint by tube 67.

To secure the proper cooling of the engine, I have provided a radiator member 45 which is mounted behind a grill 46 in the fuselage of the aircraft. A fan 47 mounted on the engine will cause air to be drawn through the radiator and through the conduit 55a. The air can then be expelled through openings 48 in the bottom of the engine housing. All liquid lines, such as 49 and 50, and the hydraulic fluid line 51 are of rubber or the like so that they may be moved as the engine pivots in its housing.

It will be seen, from the foregoing description, that I have provided an aircraft which may operate in a vertical direction and a horizontal direction, and that should the power source fail or should the operator desire to shut off the power to secure a quiet descent or the like, he need only operate the parachute device to bring the aircraft to earth slowly and safely.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In an aircraft of the type described, a fuselage, a ball shaped housing in said fuselage, a pair of counter-rotating, shrouded propellers below said fuselage, a motor mounted in said fuselage in said housing to drive said propellers and adapted to be moved in an arc, hydraulic means between said fuselage and said propellers adapted to tilt said motor, housing and said propellers to cause said aircraft to move longitudinally, parachute means mounted in said fuselage, and means to eject said parachute at will.

2. In a device of the type described, a fuselage, a ball shaped housing, a second ball shaped housing mounted for rotation within the first housing, shrouded counter-rotating propellers mounted on the lower portion of said fuselage and in close proximity thereto, a motor mounted in said second ball housing and adapted to drive said propellers, a plurality of hydraulic jacks mounted between said fuselage and said propellers and adapted to vary the spacing between said fuselage and said propellers around the circumference thereof to cause the aircraft to move in a selective longitudinal direction, hatch covers in the upper portion of said fuselage, a parachute under said hatch covers, means for inflating said parachute, and control means adapted to unlatch said hatch covers and actuate said inflating means at will whereby upon failure of aforesaid power means, said parachute may be ejected to prevent the rapid descent of said aircraft.

3. In an aircraft of the type described, a cylindrical fuselage having counter-rotating propellers of approximately the same circumference mounted therebelow and having hydraulic means mounted on the outer circumferential perimeter thereof to vary the angular relation between said fuselage and said propellers, said fuselage further having a compartment in the upepr portion thereof, a hatch over said compartment having a latch in conjunction therewith, a parachute in said compartment, a bag formed integrally with said parachute, means for inflating said bag, and control means adapted to actuate said latch and said inflating means simultaneously.

4. In an aircraft of the type described, a fuselage, an engine in the fuselage, a pair of counter-rotating propellers powered by said engine and mounted below said fuselage, a shroud about said propellers, a plurality of tanks mounted in said shroud, said tanks being adapted to contain compressed gas, a parachute above said fuselage having a sealed bag therein operatively connected to said tanks, a swivel joint between said parachute and said fuselage, said joint being adapted to pass gas therethrough, and vane means integral with said parachute to cause the rotating movement thereof.

References Cited in the file of this patent

UNITED STATES PATENTS

| | | |
|---|---|---|
| 1,435,190 | Leggelo | Nov. 14, 1922 |
| 2,224,357 | Pecker | Dec. 10, 1940 |
| 2,665,093 | Manfredi | Jan. 5, 1954 |

FOREIGN PATENTS

| | | |
|---|---|---|
| 8,396 | Switzerland | Apr. 21, 1894 |

OTHER REFERENCES

Aviation Week, issue of Apr. 25, 1955, page 47.